United States Patent
Zhou et al.

(10) Patent No.: US 10,853,957 B2
(45) Date of Patent: Dec. 1, 2020

(54) REAL-TIME KEY VIEW EXTRACTION FOR CONTINUOUS 3D RECONSTRUCTION

(71) Applicant: Carestream Dental Technology Topco Limited, London (GB)

(72) Inventors: Yu Zhou, Shanghai (CN); Qinran Chen, Shanghai (CN)

( * ) Notice: Subject to any disclaimer, the term of this patent is extended or adjusted under 35 U.S.C. 154(b) by 0 days.

(21) Appl. No.: 15/766,230

(22) PCT Filed: Nov. 5, 2015

(86) PCT No.: PCT/US2015/059123
§ 371 (c)(1),
(2) Date: Apr. 5, 2018

(87) PCT Pub. No.: WO2017/062043
PCT Pub. Date: Apr. 13, 2017

(65) Prior Publication Data
US 2018/0286063 A1 Oct. 4, 2018

Related U.S. Application Data (60) Provisional application No. 62/238,746, filed on Oct. 8, 2015.

(51) Int. Cl.
*G06T 7/521* (2017.01)
*G06T 7/564* (2017.01)

(52) U.S. Cl.
CPC .............. *G06T 7/521* (2017.01); *G06T 7/564* (2017.01); *G06T 2207/10028* (2013.01); *G06T 2207/30036* (2013.01)

(58) Field of Classification Search
None
See application file for complete search history.

(56) References Cited

U.S. PATENT DOCUMENTS

| | | | | |
|---|---|---|---|---|
| 5,831,621 | A * | 11/1998 | Pito | G01B 11/24 345/419 |
| 2010/0311005 | A1* | 12/2010 | Liang | A61B 1/00009 433/29 |
| 2013/0120532 | A1* | 5/2013 | Milch | A61C 9/006 348/45 |
| 2013/0120533 | A1 | 5/2013 | Milch | |

FOREIGN PATENT DOCUMENTS

WO WO-2014100950 A1 * 7/2014 ............ A61B 5/067

OTHER PUBLICATIONS

Kriegel et al, "A Surface-Based Next-Best-View Approach for Automated 3D Model Completion of Unknown Objects", 2011 IEEE Intl. Conf. on Robotics and Automation, May 2011. (Year: 2011).*

Kriegel et al, "Efficient Next-Best-Scan Planning for Autonomous 3D Surface Reconstruction of Unknown Objects", Journal of Real-Time Image Processing, Dec. 2013. (Year: 2013).*

World Intellectual Property Organization, PCT International Search Report and Written Opinion, International Patent Application No. PCT/US2015/059123, filed Nov. 5, 2015.

* cited by examiner

*Primary Examiner* — Patrick F Valdez (57) ABSTRACT

A method for forming a subset having a number of member 3D contour images, the method executed at least in part on a computer, selects a first 3D contour image as a member image, obtains a candidate 3D contour image, computes an overlap between the candidate 3D contour image and the first 3D contour image, and adds the candidate 3D contour image to the subset according to the overlap computation.

10 Claims, 9 Drawing Sheets

REAL-TIME KEY VIEW EXTRACTION FOR CONTINUOUS 3D RECONSTRUCTION

FIELD OF THE INVENTION

The invention relates generally to the field of surface shape imaging and more particularly relates to apparatus and methods for improved processing of three-dimensional (3D) images generated as part of continuous 3D reconstruction.

BACKGROUND

Structured light imaging is one familiar technique that has been successfully applied for surface characterization. In structured light imaging, a pattern of illumination is projected toward the surface of an object from a given angle. The pattern can use parallel lines of light or more complex periodic features, such as sinusoidal lines, dots, or repeated symbols, and the like. The light pattern can be generated in a number of ways, such as using a mask, an arrangement of slits, interferometric methods, or a spatial light modulator, such as a Digital Light Processor from Texas Instruments Inc., Dallas, Tex. or similar digital micromirror device. Multiple patterns of light may be used to provide a type of encoding that helps to increase robustness of pattern detection, particularly in the presence of noise. Light reflected or scattered from the surface is then viewed from another angle as a contour image, taking advantage of triangulation in order to analyze surface information based on the appearance of contour lines or other patterned illumination.

Structured light imaging has been used effectively for surface contour imaging of solid, highly opaque objects and has been used for imaging the surface contours for some portions of the human body and for obtaining detailed data about skin structure. Structured light imaging methods have also been applied to the problem of dental imaging, helping to provide detailed surface information about teeth and other intraoral features. Intraoral structured light imaging is now becoming a valuable tool for the dental practitioner, who can obtain this information by scanning the patient's teeth using an inexpensive, compact intraoral scanner, such as the Model CS3500 Intraoral Scanner from Carestream Dental, Atlanta, Ga.

There is significant interest in providing intraoral camera and scanner devices capable of generating images in real time. The advent of less expensive video imaging devices and advancement of more efficient contour image processing algorithms now make it possible to acquire structured light images without the need to fix the scanner in position for individually imaging each tooth. With upcoming intraoral imaging systems, it can be possible to acquire contour image data by moving the scanner/camera head over the teeth, allowing the moving camera to acquire a large number of image views that can be algorithmically fitted together and used to for forming the contour image.

Contour imaging uses patterned or structured light to obtain surface contour information for structures of various types. In structured light projection imaging, a pattern of lines or other shapes is projected toward the surface of an object from a given direction. The projected pattern from the surface is then viewed from another direction as a contour image, taking advantage of triangulation in order to analyze surface information based on the appearance of contour lines. Phase shifting, in which the projected pattern is incrementally spatially shifted for obtaining images that provide additional measurements at the new locations, is typically applied as part of structured light projection imaging, used in order to complete the contour mapping of the surface and to increase overall resolution in the contour image.

In order to use the advanced imaging capabilities that video offers for contour imaging of dental features, a number of new problems must be addressed. One difficulty relates to the raw amount of data that is obtained in continuously scanning and collecting structured light images in video mode. Data continues to be acquired even where the scanner is moved slowly through the patient's mouth or if the scanner is placed on the dental work-table. Data redundancy can result, obtaining excessively large amounts of image data that has been acquired over the same area of the mouth or obtaining unnecessary image data from outside of the patient's mouth. Storage and processing of redundant or unneeded data can require substantial processor resources as well as making significant demands on memory capability. Without using some methods for properly managing and using the rapidly acquired image data from real-time 3D scanning, many of the potential benefits of video 3D scanning may not be realized.

Useful strategies for improving 3D imaging system performance include identifying and updating a limited set of image frames that best characterize the surface contour. Extracted from the continuous stream of scanner images that is collected during scanning, this smaller set of image frames reduces the amount of redundant data that can slow image processing and helps to speed functions such as recovery of 3D assembly processing, on-line hole filling, registration such as bite registration, and other tasks. By restricting membership to this limited set, scanner processing overall can be made more highly efficient, with improved response speed.

Thus, it can be appreciated that there is a need for apparatus and methods that capture video structured light image data more efficiently and reduce excessive data storage demands for intra-oral imaging applications.

SUMMARY

An object of the present invention is to advance the art of surface contour characterization, such as contour imaging of teeth and related intraoral structures. Embodiments of the present disclosure address the need for improved efficiency and processing speed using 3D scanner image data.

These aspects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method for forming a subset comprising a plurality of member 3D contour images, the method executed at least in part on a computer and comprising:
 selecting a first 3D contour image as a member image;
 obtaining a candidate 3D contour image;
 computing an overlap between the candidate 3D contour image and the first 3D contour image;
 and
 adding the candidate 3D contour image to the subset according to the overlap computation.

BRIEF DESCRIPTION OF THE DRAWINGS

The foregoing and other objects, features, and advantages of the invention will be apparent from the following more particular description of the embodiments of the invention, as illustrated in the accompanying drawings.

The elements of the drawings are not necessarily to scale relative to each other. Some exaggeration may be necessary in order to emphasize basic structural relationships or principles of operation. Some conventional components that would be needed for implementation of the described embodiments, such as support components used for providing power, for packaging, and for mounting and protecting system optics, for example, are not shown in the drawings in order to simplify description.

DETAILED DESCRIPTION OF EXEMPLARY EMBODIMENTS

This application claims the benefit of U.S. Provisional application Ser. No. 62/238,746, provisionally filed on Oct. 8, 2015, entitled "REAL-TIME KEY VIEW EXTRACTION FOR CONTINUOUS 3D RECONSTRUCTION", in the names of Yu Zhou et al, which is incorporated herein by reference in its entirety.

The following is a detailed description of the preferred embodiments, reference being made to the drawings in which the same reference numerals identify the same elements of structure in each of the several figures.

Where they are used in the context of the present disclosure, the terms "first", "second", and so on, do not necessarily denote any ordinal, sequential, or priority relation, but are simply used as labels to more clearly distinguish one step, element, or set of elements from another and are not intended to impose numerical requirements on their objects, unless specified otherwise.

As used herein, the term "energizable" relates to a device or set of components that perform an indicated function upon receiving power and, optionally, upon receiving an enabling signal.

In the context of the present disclosure, the terms "structured light illumination", "fringe pattern", or "patterned illumination" are used to describe the type of illumination that is used for structured light projection imaging or "contour" imaging that characterizes tooth shape. The structured light pattern itself can include, as patterned light features, one or more lines, circles, curves, or other geometric shapes that are distributed over the area that is illuminated and that have a predetermined spatial and temporal frequency. One exemplary type of structured light pattern that is widely used for contour imaging is a pattern of evenly spaced lines of light projected onto the surface of interest.

In the context of the present disclosure, the term "structured light image" refers to the image that is captured during projection of the light pattern or "fringe pattern" that is used for characterizing the tooth contour. "Contour image" and "contour image data" refer to the processed image data that are generated and updated from structured light images.

In the context of the present disclosure, the term "optics" is used generally to refer to lenses and other refractive, diffractive, and reflective components used for shaping and orienting a light beam.

In the context of the present disclosure, the terms "viewer", "operator", and "user" are considered to be equivalent and refer to the viewing practitioner, technician, or other person who may operate a camera or scanner and may also view and manipulate an image, such as a dental image, on a display monitor. An "operator instruction" or "viewer instruction" is obtained from explicit commands entered by the viewer, such as by clicking a button on the camera or by using a computer mouse or by touch screen or keyboard entry.

The term "set", as used herein, refers to a non-empty set, as the concept of a collection of one or more elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the phrase "in signal communication" indicates that two or more devices and/or components are capable of communicating with each other via signals that travel over some type of signal path. Signal communication may be wired or wireless. The signals may be communication, power, data, or energy signals. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

In the context of the present disclosure, the terms "camera" and "scanner" are used interchangeably, as the description relates to structured light images successively projected and captured by a camera device operating in a continuous acquisition or video mode.

As was noted earlier in the background section, structured light images can be acquired with the scanner operating in video mode, so that structured light patterns are continuously directed to the tooth and images successively acquired. However, this can lead to significant data redundancy and the need for a substantial amount of processing of duplicate data or image content that has no value for contour imaging of the mouth, such as data obtained when the camera is momentarily placed on the dental worktable or other work surface. On/off switches or manual controls for adjusting scanner acquisition rate can prove cumbersome in practice and do not help to differentiate useful image content from redundant or unnecessary image content.

Image processing for a 3D scanning apparatus such as an intra-oral imaging camera can use information from multiple images in order to render an image or images that have been generated to provide usable information on bite registration or other characteristic of the imaged subject. For functions such as bite registration imaging, for example, it can be possible to extract image information directly from the video stream and use this image information to generate the needed synthesized image content. However, for identifying and rendering images that present many types of representative features of the subject, particularly where image content shows particular structural relationships for example, it is often useful and more efficient for the image processing logic to generate an image showing particular features by operating on a smaller subset of images that still provides sufficient surface data. This subset of key view images can contain images that have been pre-evaluated and determined to have valuable and non-redundant image content.

Image processing systems that obtain 2D images and generate corresponding 3D images accordingly have employed a set of key image frames for providing sufficient data for speeding analysis and reconstruction. An example of 2D image selection criteria for this purpose is given in International Publication No. WO 2014/154533 A1 by Sorgi et al. Criteria used can help to determine whether the key 2D image frame is suitable for structure-from-motion (SFM) analysis, triangularization, 3D reconstruction, and other processing.

With image acquisition and processing at video speeds, image content that is available from an intraoral scanning device can include processed 3D image content that can be quickly integrated into a 3D surface model. The capability for continuously acquired 3D data enhances the user viewing experience, but places significant demands on processor and memory resources, as noted previously. A number of system functions, such as position recovery for scanner tracking, online hole filling, bite registration, and other operations operate more efficiently on more limited sets of 3D data, as long as the set of 3D image data that is available includes a sufficient amount of surface information.

To meet the need for generating a limited set of 3D images that is sufficient for supporting various image analysis operations, embodiments of the present disclosure provide apparatus and methods for populating a key view set that is a subset of the acquired 3D images, wherein each member of the subset contains information that is of value for rendering the needed types of images and wherein redundancies are significantly reduced. The key value set is constructed, over time, from the video stream results and can be updated continuously or periodically as more recent 3D video image data is acquired.

Figure 1:
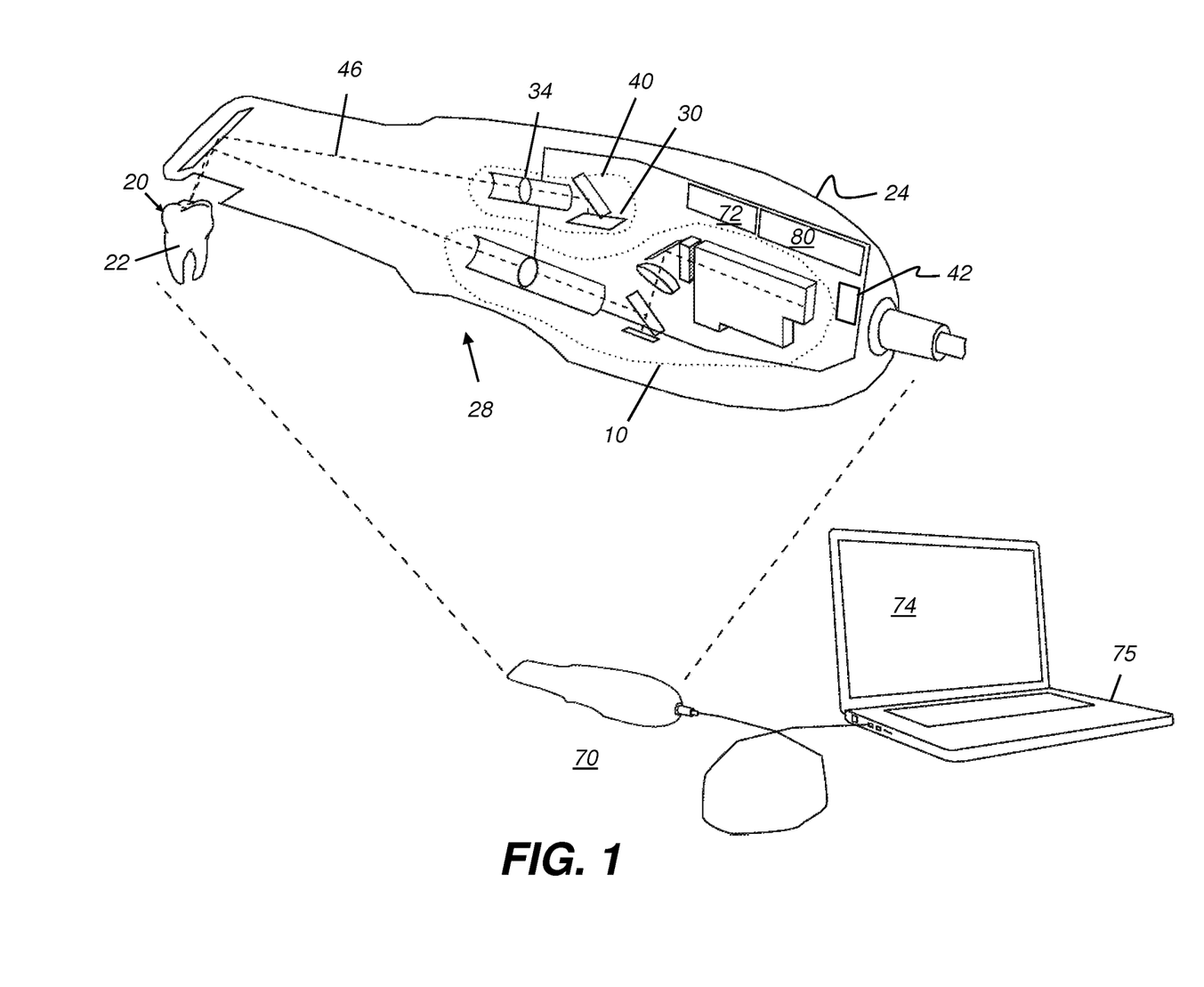
FIG. 1 is a schematic diagram that shows components of an imaging apparatus for surface contour imaging of a patient's teeth and related structures.

FIG. 1 is a schematic diagram showing an imaging apparatus 70 that operates as a video camera 24 for image capture as well as a scanner 28 for projecting and imaging to characterize surface contour using structured light patterns 46. A handheld imaging apparatus 70 uses a video camera 24 for image acquisition for both contour scanning and image capture functions according to an embodiment of the present disclosure. A control logic processor 80, or other type of computer that may be part of camera 24, controls the operation of an illumination array 10 that generates the structured light and directs the light toward a surface position and controls operation of an imaging sensor array 30. Image data from surface 20, such as from a tooth 22, is obtained from imaging sensor array 30 and stored as video image data in a memory 72. Imaging sensor array 30 is part of a sensing apparatus 40 that includes an objective lens 34 and associated elements for acquiring video image content. Control logic processor 80, in signal communication with camera 24 components that acquire the image, processes the received image data and stores the 3D contour image data in memory 72. The resulting image content from memory 72 is then optionally rendered and displayed on a display 74, which may be part of another computer 75 used for some portion of the processing described herein. Memory 72 may also include a display buffer. One or more sensors 42, such as a motion sensor, can also be provided as part of scanner 28 circuitry.

In structured light imaging, a pattern of lines or other shapes is projected from illumination array 10 toward the surface of an object from a given angle. The projected pattern from the illuminated surface position is then viewed from another angle as a contour image, taking advantage of triangulation in order to analyze surface information based on the appearance of contour lines. Phase shifting, in which the projected pattern is incrementally shifted spatially for obtaining additional measurements at the new locations, is typically applied as part of structured light imaging, used in order to complete the contour mapping of the surface and to increase overall resolution in the contour image.

Figure 2:
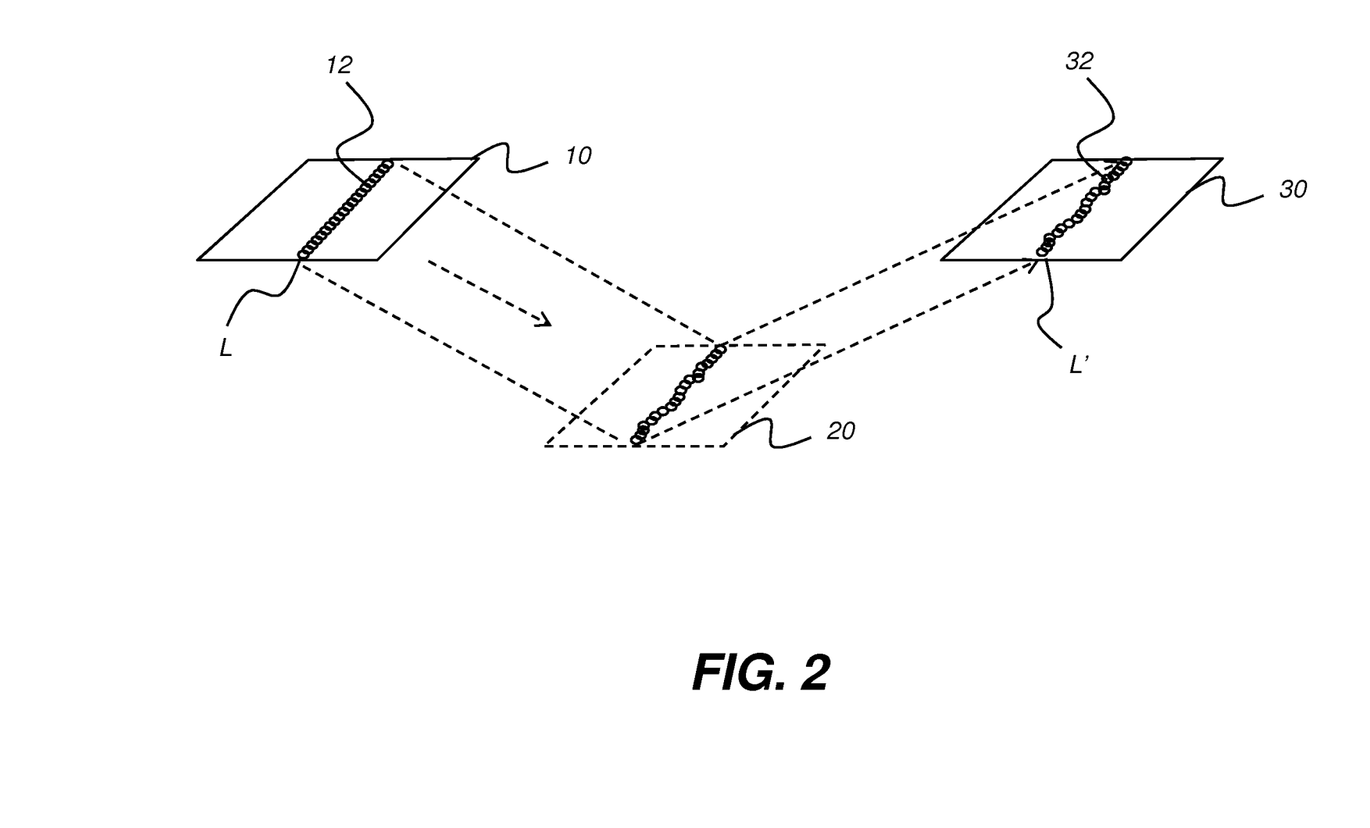
FIG. 2 shows schematically how patterned light is used for obtaining surface contour information using a handheld camera or other portable imaging device.

The schematic diagram of FIG. 2 shows, with the example of a single line of light L, how patterned light is used for obtaining surface contour information by a scanner using a handheld camera or other portable imaging device. A mapping is obtained as an illumination array 10 directs a pattern of light onto a surface 20 and a corresponding image of a line L' is formed on an imaging sensor array 30. Each pixel 32 on imaging sensor array 30 maps to a corresponding pixel 12 on illumination array 10 according to modulation by surface 20. Shifts in pixel position, as represented in FIG. 2, yield useful information about the contour of surface 20. It can be appreciated that the basic pattern shown in FIG. 2 can be implemented in a number of ways, using a variety of illumination sources and sequences for light pattern generation and using one or more different types of sensor arrays 30. Illumination array 10 can utilize any of a number of types of arrays used for light modulation, such as a liquid crystal array or digital micromirror array, such as that provided using the Digital Light Processor or DLP device from Texas Instruments, Dallas, Tex. This type of spatial light modulator is used in the illumination path to change the light pattern as needed for the mapping sequence.

By projecting and capturing images that show structured light patterns that duplicate the arrangement shown in FIG. 1 multiple times, the image of the contour line on the camera simultaneously locates a number of surface points of the imaged object. This speeds the process of gathering many sample points, while the plane of light (and usually also the receiving camera) is laterally moved in order to "paint" some or all of the exterior surface of the object with the plane of light.

A synchronous succession of multiple structured light patterns can be projected and analyzed together for a number of reasons, including increasing the density of lines for additional reconstructed points and for detecting and/or correcting incompatible line sequences. Use of multiple structured light patterns is described in commonly assigned U.S. Patent Application Publications No. US2013/0120532 and No. US2013/0120533, both entitled "3D INTRAORAL MEASUREMENTS USING OPTICAL MULTILINE METHOD" and incorporated herein in their entirety.

Figure 3:
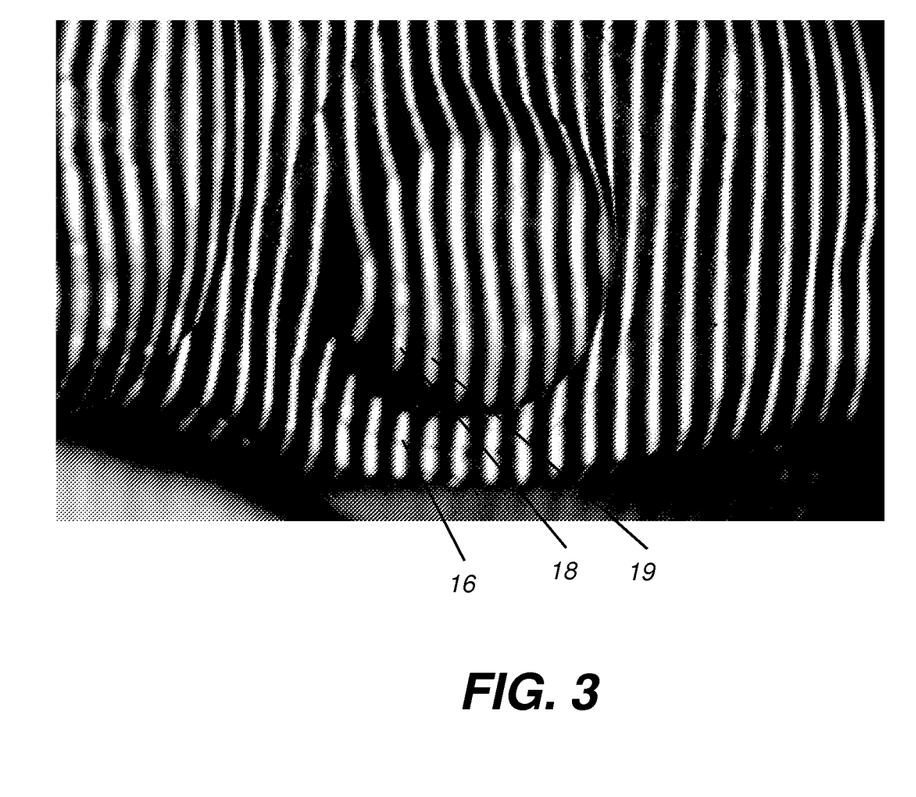
FIG. 3 shows an example of surface imaging using a pattern with multiple lines of light.

FIG. 3 shows surface imaging using a pattern with multiple lines of light. Incremental shifting of the line pattern and other techniques help to compensate for inaccuracies and confusion that can result from abrupt transitions along the surface, whereby it can be difficult to positively identify the segments that correspond to each projected line. In FIG. 3, for example, it can be difficult over portions of the surface to determine whether line segment 16 is from the same line of illumination as line segment 18 or adjacent line segment 19.

By knowing the instantaneous position of the camera and the instantaneous position of the line of light within a object-relative coordinate system when the image was acquired, a computer and software can use triangulation methods to compute the coordinates of numerous illuminated surface points relative to a plane. As the plane is moved to intersect eventually with some or all of the surface of the object, the coordinates of an increasing number of points are accumulated. As a result of this image acquisition, a point cloud of vertex points or vertices can be identified and used to represent the extent of a surface within a volume. The points in the point cloud then represent actual, measured points on the three dimensional surface of an object. A mesh can then be constructed, connecting points on the point cloud as vertices that define individual congruent polygonal faces (typically triangular faces) that characterize the surface shape.

To help improve computational response time for processing the acquired video 3D image data, an embodiment of the present disclosure forms a key view set that contains a limited subset of the 3D image content that has been acquired. In order to enter a candidate 3D image into the key view set, the system quickly checks the overlap between the candidate 3D image and other views that are already in the key view set. If there is overlap below a given value, the candidate 3D image can be added to the set. The threshold value used for overlap determination can be a value such as 50% for example.

Figure 4:
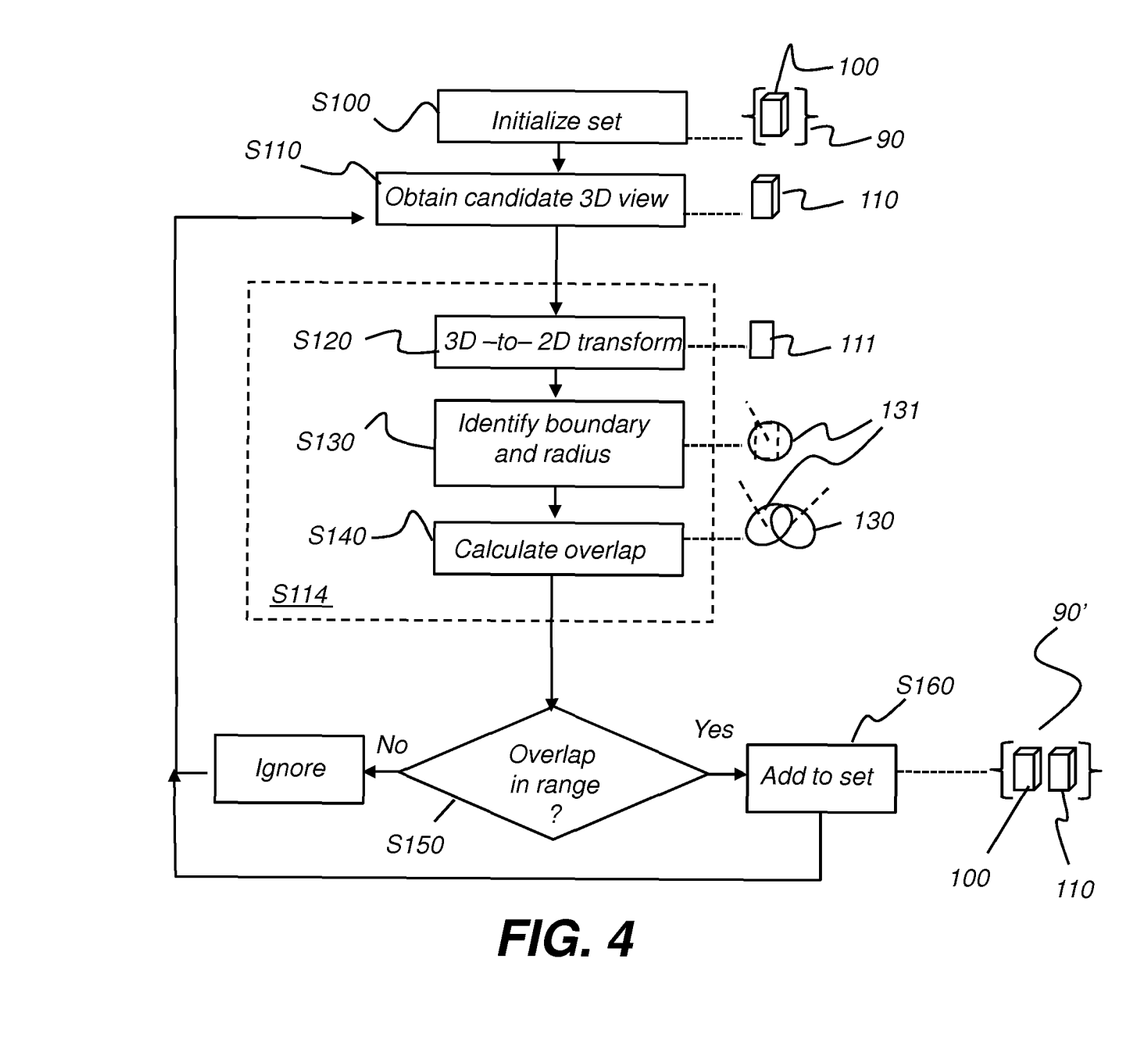
FIG. 4 is a logic flow diagram that shows a sequence for forming a key view set according to an embodiment of the present disclosure.
Figure 5:
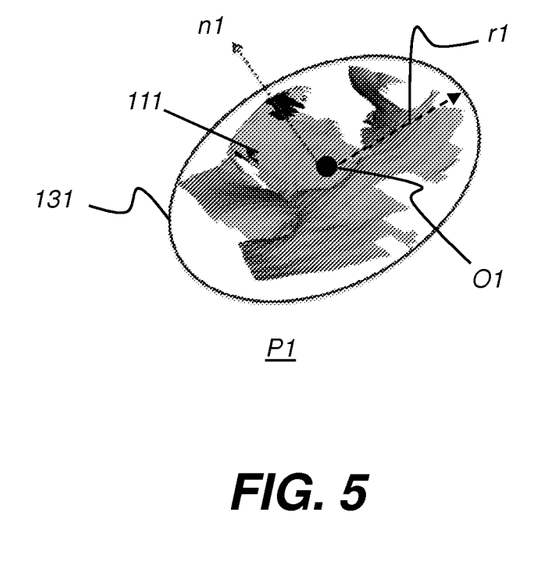
FIG. 5 is a schematic view that shows a transformation and bounding of an exemplary 3D image as a 2D image having a view angle indicated by a normal.
Figure 6:
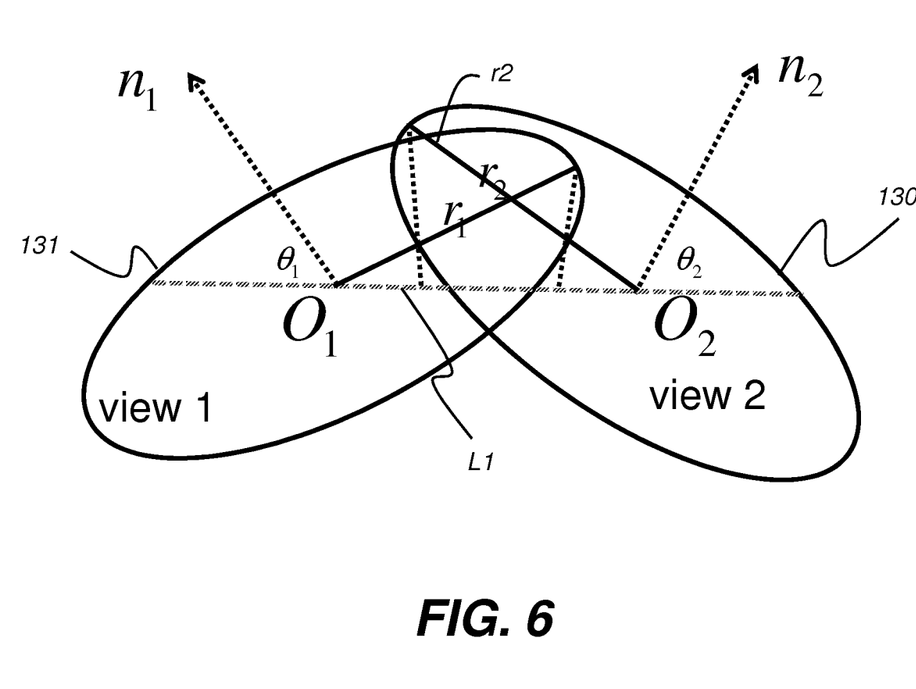
FIG. 6 is a schematic diagram that shows computation of an overlap between a transformed candidate image and a transformed member image.
Figure 7:
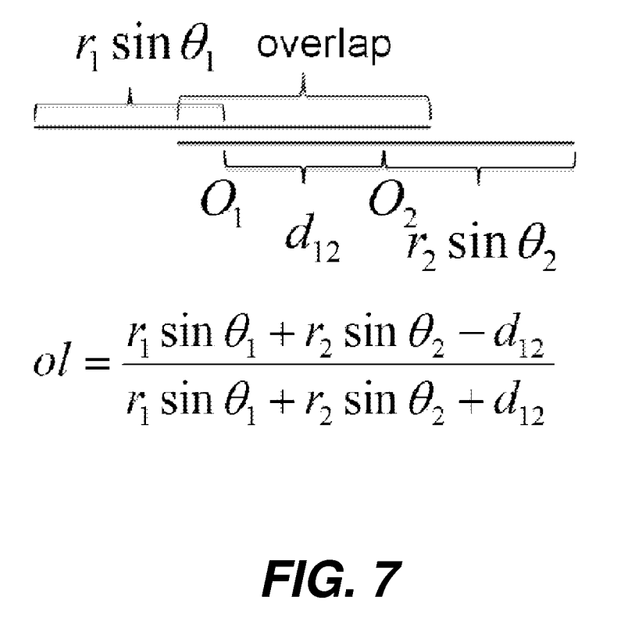
FIG. 7 shows a calculation for computing an overlap between a transformed candidate image and a transformed member image.

The logic flow diagram of FIG. 4 shows a sequence that can be used to construct and update a set of key views to speed advanced processing of the acquired 3D data content. FIGS. 5, 6, and 7 show supporting details for individual steps and computation to determine relative view overlap that determines whether or not a candidate 3D image is to be added to the key view set.

Beginning with FIG. 4, in an initialization step S100, a first 3D member image 100 in the series simply becomes the first member of a key view set 90 as a type of "seed" member. Subsequent steps then repeat during the video scan to evaluate each candidate member and construct and update the key view set 90 as needed. In this repeated sequence, an obtain candidate image step S110 acquires a next 3D image 110 as a candidate.

An overlap computation sequence S114 then executes steps S120, S130, and S140 that determine how much overlap exists between a candidate 3D image and each member of the key view set 90. As part of this sequence, a transform step S120 performs a 3D-to-2D transform on the image 110 to form a corresponding 2D image 111. A boundary step S130 then identifies a boundary 131 and radius r of the transformed 2D image 111 within a plane P1, as shown in FIG. 5. A calculation step S140 calculates overlap between the particular image 111 and other images in the current key view set 90, using calculation logic to compare boundaries 130 (wherein boundary 130 is for another image from set 90) and 131 (wherein boundary 131 is for the candidate image) as shown in FIGS. 5 and 6. A decision step S150 determines whether or not at least one of the calculated overlap values is within the range that admits the candidate 3D image 110 to form an updated key view set 90' in an add step S160. If none of the overlap values is within range, the candidate 3D image 110 is ignored. It should be noted that 3D image 110 not added to the key view set 90 is not discarded but can still be used to form the 3D model that is continuously generated by the system software to show the structure of the imaged subject. That is, if 3D image 110 is ignored, it is simply not added to key view set 90 and the logic repeats, obtaining a subsequent candidate 3D view image in step S110 and proceeding with subsequent steps in computation sequence S114.

Those skilled in the volume image processing arts can appreciate that calculating overlap in calculation step S140 can be difficult and demanding on processor and memory resources when using standard techniques for checking two images against each other. Moreover, the problem is complicated by the 3D nature of the image content, since different 3D images can be disposed at different view angles. The view angle that is used is considered in performing the 3D-to-2D conversion of step S120. Embodiments of the present disclosure address the problem of overlap computation using procedure described subsequently.

FIG. 5 shows an exemplary 2D image 111 with boundary 131 formed with radius r that is based on the furthest extent of the mesh from a central point. A normal n1 extends from the central point of image 111, an origin O1, and is indicative of the view angle for the original 3D image 110 (FIG. 4).

Figure 8:
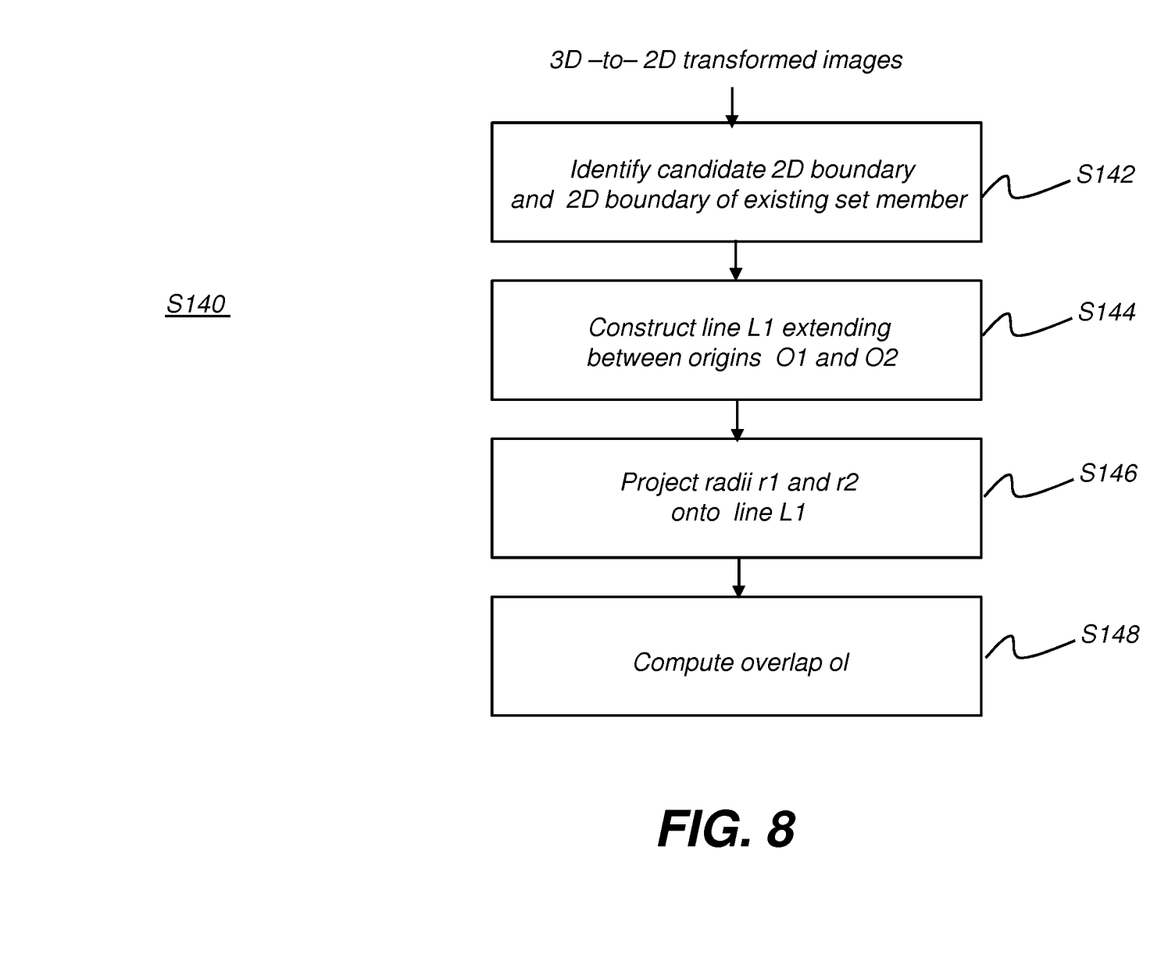
FIG. 8 is a logic flow diagram that shows a sequence for calculation of overlap between a candidate image and a member image.

FIGS. 6 and 7 show further details and calculations computed for detection of overlap ol in calculation step S140, using the sequence shown in the logic flow diagram of FIG. 8. The sequence of FIG. 8 repeats for computing overlap ol between the boundary 131 of the candidate 2D transformed image 111 and the boundary 130 of each image already in key view set 90 (FIG. 4). Turning to FIGS. 6 and 8, an identification step S142 takes the 3D-to-2D transformed images as input and identifies the candidate boundary 131 and one existing member boundary 130. A construction step S144 constructs, for the sake of computation, a line L1 extending between origin O1 for the candidate image boundary 131 and origin O2 for the boundary 130 of the existing set 90 member. A projection step S146 then projects, onto line L1, the respective radii, r1 for the candidate image with boundary 131 and r2 for the existing member image with boundary 130.

With reference to FIG. 6, the direction of the respective radius r1 is defined by intersection of the boundary 131 and the plane (not shown) determined by line L1 and normal n1. The direction of the respective radius r2 is defined by intersection of the boundary 130 and the plane (not shown) determined by line L1 and normal n2

Continuing with the FIG. 8 sequence, a computation step S148 then performs the computation shown in FIG. 7. Angle $\theta_1$ is between normal n1 and line L1. Angle $\theta_2$ is between normal n2 for the existing member and line L1. A distance d12 is the Euclidean distance between origins O1 and O2. Recall that origins O1 and O2 lie in their respective planes, corresponding in each case to the plane resulting from transform step 140 in FIG. 4. In the FIG. 7 calculation, the numerator is formed from the sum of first and second distances ($r_1 \sin \theta_1 + r_2 \sin \theta_2$) minus the distance $d_{12}$ and denominator is formed from the sum of the first and second distances ($r_1 \sin \theta_1 + r_2 \sin \theta_2$) plus the third distance $d_{12}$.

In step S150 of FIG. 4, the overlap ol value is compared against a predetermined threshold value to determine whether or not overlap indicates that the candidate image should be accepted into key view set 90. The threshold value can be empirically determined, and can be a value such as 0.5, 0.44, 0.56, or other suitable value.

The key view set 90 that is formed using the method described herein can be separately stored and displayed, as well as being transmitted between two or more computers. Other algorithms that run on control logic processor 80 (FIG. 1) or another computer can use the key view set 90 to execute efficiently for various functions related to the 3D surface contour images, as noted previously.

Figure 9:
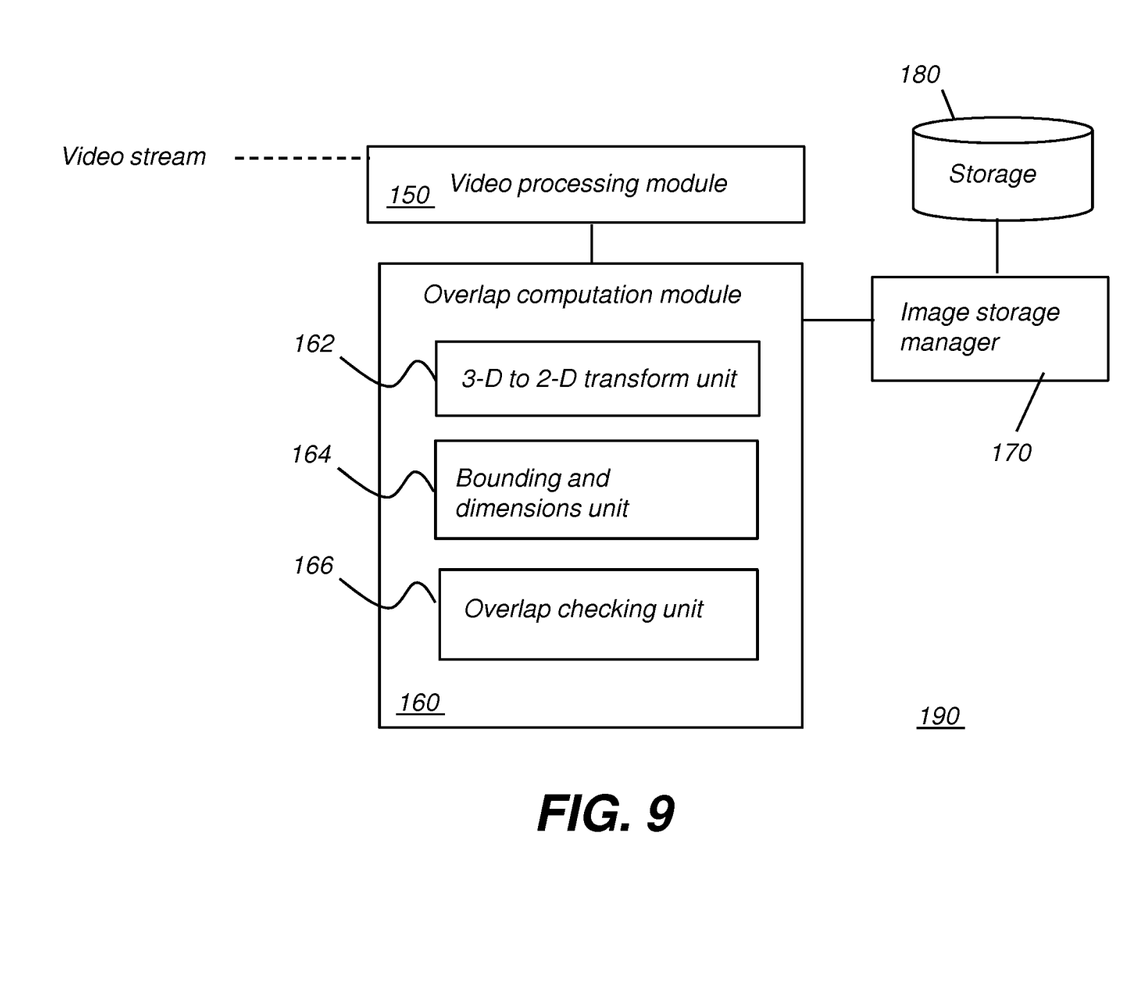
FIG. 9 is a block diagram that shows structural components of a computer processor configured by programmed instructions to execute the key view extraction functions according to an embodiment of the present disclosure.

The block diagram of FIG. 9 shows structural components of a computer processor 190 configured by programmed instructions to execute the key view extraction functions according to an embodiment of the present disclosure. A video processing module 150 obtains each 3D image from the video stream of the scanner 28 (FIG. 1) and provides a copy of each image obtained to an overlap computation module 160 for executing the logic functions described previously. Overlap computation module 160 has a 3-D to 2-D transform unit 162 that executes the transform logic, a bounding and dimensions unit 164 that provides bounding and dimensional information for an overlap checking module 166 that performs the overlap computation of the transformed 2-D images in 1-D and determines whether or not to store the obtained image by providing the needed signals to an image storage manager 170 that adds the 3D image content to image storage 180.

Exemplary method and/or apparatus embodiments according to the application have various advantages. Exemplary method and/or apparatus embodiments can determine in real time (e.g., during acquisition) member of the subset of contour views acquired that can form the key view set. In order to enter a candidate 3D image into the key view set, embodiments according to the application can quickly check the overlap between the candidate 3D image and other views that are already in the key view set (e.g., all previous key views n the key view set, a portion of the key view set, a single one such as the most recent member of the key view set or a closest spatial member of the key view set). Exemplary method and/or apparatus embodiments can transform candidate 3D images and key view set 3D images into 2D images for overlap calculations (preferably overlap calculations in 1D). Certain exemplary embodiments described herein used a center, a normal indicative of a view angle and a plane and extending outward from the center, and a boundary in the plane having a radius extending from the center as a 2D transformed representation, however, embodiments of the application are not intended to be so limited as alternative 2D transforms can be used. For example, alternative 2D transforms can be used so long as they can provide an orientation and size (e.g., boundary of the 3D image) for overlap comparisons that can be projected to a 1D value. Thus, a center, orientation and size can have differing representations (e.g., a center of momentum or orientation of the 3D image, bounding polygon, or an averaged measurement used as a distance in the 2D transform). Embodiments according to the application can use the key view set as a reference to speed up at least one of searching and tracking process in bite registration, online matching, global matching, and post-processing operations during the scanning and 3D reconstruction of the tooth surface.

Consistent with an embodiment of the present invention, a computer executes a program with stored instructions that perform on image data accessed from an electronic memory. As can be appreciated by those skilled in the image processing arts, a computer program of an embodiment of the present invention can be utilized by a suitable, general-purpose computer system, such as a personal computer or workstation, as well as by a microprocessor or other dedicated processor or programmable logic device. However, many other types of computer systems can be used to execute the computer program of the present invention, including networked processors. The computer program for performing the method of the present invention may be stored in a computer readable storage medium. This medium may comprise, for example; magnetic storage media such as a magnetic disk (such as a hard drive) or magnetic tape or other portable type of magnetic disk; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware.

It will be understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

In the context of the present disclosure, the act of "recording" images means storing image data in some type of memory circuit in order to use this image data for subsequent processing. The recorded image data itself may be stored more permanently or discarded once it is no longer needed for further processing.

It should be noted that the term "memory", equivalent to "computer-accessible memory" in the context of the present disclosure, can refer to any type of temporary or more enduring data storage workspace used for storing and operating upon image data and accessible to a computer system. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types. Computer-accessible memory of various types is provided on different components throughout the system for storing, processing, transferring, and displaying data, and for other functions.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim.

While the invention has been illustrated with respect to one or more implementations, alterations and/or modifications can be made to the illustrated examples without departing from the spirit and scope of the appended claims. In addition, while a particular feature of the invention can have been disclosed with respect to one of several implementations, such feature can be combined with one or more other features of the other implementations as can be desired and advantageous for any given or particular function. The term "at least one of" is used to mean one or more of the listed items can be selected. The term "about" indicates that the value listed can be somewhat altered, as long as the alteration does not result in nonconformance of the process or structure to the illustrated embodiment. Finally, "exemplary" indicates the description is used as an example, rather than implying that it is an ideal.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims, and all changes that come within the meaning and range of equivalents thereof are intended to be embraced therein.

The invention claimed is:

1. A method for forming a subset comprising a plurality of member 3D contour images, the method executed at least in part on a computer and comprising the steps of:
    selecting a first 3D contour image as a member image;
    obtaining a candidate 3D contour image;
    computing an overlap between the candidate 3D contour image and the first 3D contour image, wherein the step of computing the overlap comprises:
        transforming the member image to a first 2D image having a first center, a first normal indicative of a first view angle and a first plane and extending outward from the first center, and a first boundary in the first plane having a first radius extending from the first center;
        transforming the candidate image to a second 2D image having a second center, a second normal indicative of a second view angle and a second plane and extending outward from the second center, and a second boundary in the second plane having a second radius extending from the second center;
        obtaining a first distance by projecting the first radius onto a line connecting the first center to the second center;
        obtaining a second distance by projecting the second radius onto the line connecting the first center to the second center; and
        computing the overlap according to the first distance, the second distance, and a third distance between the first and second centers; and
    adding the candidate 3D contour image to the subset according to the overlap computation.

2. A method for forming a subset comprising a plurality of member 3D contour images, the method executed at least in part on a computer and comprising the steps of:
    selecting a first 3D contour image as a member image;
    obtaining a candidate 3D contour image;
    computing an overlap between the candidate 3D contour image and the first 3D contour image, wherein the step of computing the overlap comprises:
        transforming the member image to a first 2D image having a first center, a first normal indicative of a first view angle and a first plane and extending outward from the first center, and a first boundary in the first plane having a first radius extending from the first center;
        transforming the candidate image to a second 2D image having a second center, a second normal indicative of a second view angle and a second plane and extending outward from the second center, and a second boundary in the second plane having a second radius extending from the second center;
        obtaining a first distance by projecting the first radius onto a line connecting the first center to the second center;
        obtaining a second distance by projecting the second radius onto the line connecting the first center to the second center; and
        computing a third distance between the first and second centers; and
    adding the candidate 3D contour image to the subset according to the overlap computation;
    wherein the overlap is computed as a ratio, wherein a numerator is formed from the sum of the first and second distances minus the third distance and a denominator is formed from the sum of the first and second distances plus the third distance.

3. A method for forming a subset comprising a plurality of member 3D contour images, the method executed at least in part on a computer and comprising the steps of:
    selecting a first 3D contour image as a member image;
    obtaining a candidate 3D contour image;
    transforming the member image to a first 2D image having a first center, a first normal indicative of a first view angle and extending outward from the first center, and a first boundary having a first radius extending from the first center;
    transforming the candidate image to a second 2D image having a second center, a second normal indicative of a second view angle and extending outward from the second center, and a second boundary having a second radius extending from the second center;
    obtaining a first distance by projecting the first radius onto a line connecting the first center to the second center;
    obtaining a second distance by projecting the second radius onto the line connecting the first center to the second center;
    computing an overlap according to the first distance, the second distance, and a third distance between the first and second centers; and
    adding the candidate 3D contour image to the subset according to the overlap computation.

4. The method of claim 3, wherein the method further comprises a step of displaying a rendered 3D image that is generated using the subset of 3D contour images.

5. The method of claim 3, wherein the method further comprises a step of comparing the computed overlap to a predetermined threshold value.

6. The method of claim 3, wherein the subset is used as a reference to speed up at least one of searching and tracking process in bite registration, online matching, global matching, and post-processing operations during the scanning and 3D reconstruction of a tooth surface.

7. An apparatus for processing 3D contour images comprising:
   a video camera that continuously generates 3D contour images of a subject;
   a computer that is in signal communication with the video camera and is programmed with instructions for a process comprising a repeated sequence of:
      selecting a first 3D contour image obtained from the video camera as a member image;
      obtaining a candidate 3D contour image from the video camera;
      computing an overlap between the candidate 3D contour image and the first 3D contour image, wherein computing the overlap comprises:
         transforming the member image to a first 2D image having a first center, a first normal indicative of a first view angle and extending outward from the first center, and a first boundary having a first radius extending from the first center;
         transforming the candidate image to a second 2D image having a second center, a second normal indicative of a second view angle and extending outward from the second center, and a second boundary having a second radius extending from the second center;
         obtaining a first distance by projecting the first radius onto a line connecting the first center to the second center;
         obtaining a second distance by projecting the second radius onto the line connecting the first center to the second center; and
         computing the overlap according to the first distance, the second distance, and a third distance between the first and second centers;
      adding the candidate 3D contour image to a subset of 3D images according to the overlap computation; and
      displaying a generated 3D contour image that is rendered according to the subset of 3D images.

8. The apparatus of claim 7, wherein the subset of 3D images is used as a reference to speed up at least one of searching and tracking process in bite registration, online matching, global matching, and post-processing operations during the scanning and 3D reconstruction of a tooth surface.

9. The apparatus of claim 7, wherein the overlap is computed as a ratio, wherein a numerator is formed from the sum of the first and second distances minus the third distance and a denominator is formed from the sum of the first and second distances plus the third distance.

10. The apparatus of claim 7, wherein the repeated sequence further comprises comparing the computed overlap to a predetermined threshold value.

* * * * *